(12) United States Patent
Toukairin et al.

(10) Patent No.: US 8,014,107 B2
(45) Date of Patent: Sep. 6, 2011

(54) SUSPENSION DEVICE

(75) Inventors: Kouichi Toukairin, Kawasaki (JP);
Hirofumi Suzuki, Kawasaki (JP);
Osamu Kajitani, Kawasaki (JP);
Noriyuki Saito, Yokohama (JP); Hideki Kashima, Yokohama (JP); Tsukasa Higashi, Yokohama (JP)

(73) Assignees: NHK Spring Co., Ltd., Yokohama-Shi (JP); Toshiba Storage Device Corporation, Tokyo (JP)

( * ) Notice: Subject to any disclaimer, the term of this patent is extended or adjusted under 35 U.S.C. 154(b) by 991 days.

(21) Appl. No.: 11/900,567

(22) Filed: Sep. 12, 2007

(65) Prior Publication Data

US 2008/0062567 A1 Mar. 13, 2008

(30) Foreign Application Priority Data

Sep. 13, 2006 (JP) ................................ 2006-248437

(51) Int. Cl.
*G11B 5/60* (2006.01)
*G11B 21/21* (2006.01)

(52) U.S. Cl. ................................................ 360/245.9

(58) Field of Classification Search ............. 360/125.31, 360/125.74, 128, 234.4, 234.5, 245.8, 245.9
See application file for complete search history.

(56) References Cited

U.S. PATENT DOCUMENTS

| | | | |
|---|---|---|---|
| 6,459,043 B1 * | 10/2002 | Dodsworth | 174/254 |
| 6,801,402 B1 * | 10/2004 | Subrahmanyam et al. | 360/245.9 |
| 7,495,178 B2 * | 2/2009 | Ishii et al. | 174/255 |
| 7,643,252 B2 * | 1/2010 | Arai et al. | 360/245.9 |
| 7,684,153 B2 * | 3/2010 | Ohtsu et al. | 360/234.5 |
| 7,692,899 B2 * | 4/2010 | Arai et al. | 360/244.3 |
| 7,737,365 B2 * | 6/2010 | Ishii et al. | 174/254 |
| 7,782,571 B2 * | 8/2010 | Ishii et al. | 360/245.8 |
| 2002/0154454 A1 * | 10/2002 | Kupinski et al. | 360/323 |
| 2004/0257706 A1 * | 12/2004 | Ota et al. | 360/234.5 |
| 2005/0063097 A1 * | 3/2005 | Maruyama et al. | 360/245.9 |
| 2005/0117257 A1 * | 6/2005 | Thaveeprungsriporn et al. | 360/246 |
| 2006/0039085 A1 * | 2/2006 | Nakagawa | 360/245.9 |
| 2006/0187587 A1 * | 8/2006 | Arai et al. | 360/245.9 |
| 2006/0190673 A1 * | 8/2006 | Arai et al. | 711/101 |
| 2006/0268459 A1 * | 11/2006 | Ohtsu et al. | 360/234.5 |
| 2007/0235219 A1 * | 10/2007 | Ishii et al. | 174/261 |
| 2008/0062567 A1 * | 3/2008 | Toukairin et al. | 360/235.4 |
| 2009/0183907 A1 | 7/2009 | Ishii et al. | |

FOREIGN PATENT DOCUMENTS

| | | |
|---|---|---|
| JP | 2002-123917 A | 4/2002 |
| JP | 2008-4756 A | 1/2008 |

OTHER PUBLICATIONS

Japanese Office Action dated Mar. 22, 2011 (and English translation thereof) in counterpart Japanese Application No. 2006-248437.

\* cited by examiner

*Primary Examiner* — William J Klimowicz
(74) *Attorney, Agent, or Firm* — Holtz, Holtz, Goodman & Chick, PC

(57) ABSTRACT

A suspension device including a flexure with conductors is provided with an anti-ESD section. The anti-ESD section includes a metal plate, a insulating layer, a first electrically conductive member formed of a pair of read conductors, a second electrically conductive member formed of a pair of write conductors, a heater conductor, semiconductive layers, etc. The semiconductive layers are grounded to the metal plate and electrically isolated from one another by an insulating portion.

15 Claims, 4 Drawing Sheets

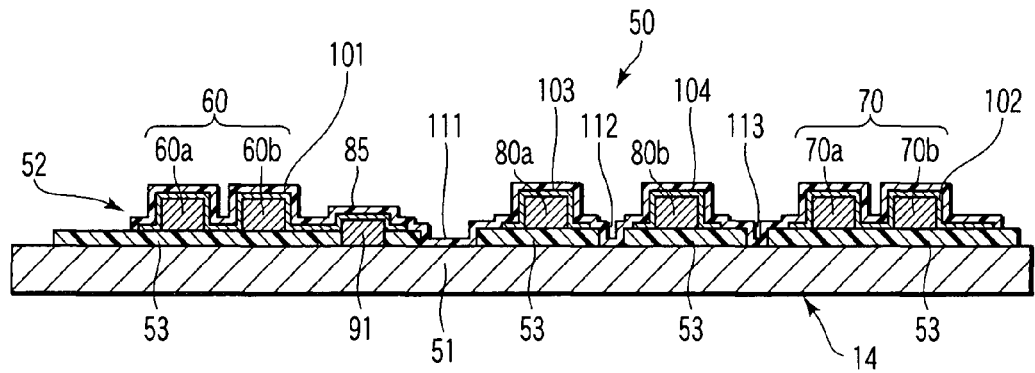
F I G. 5
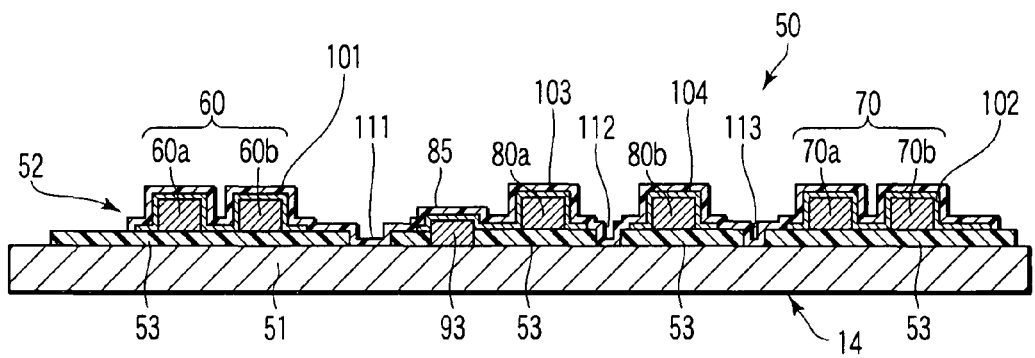
F I G. 6
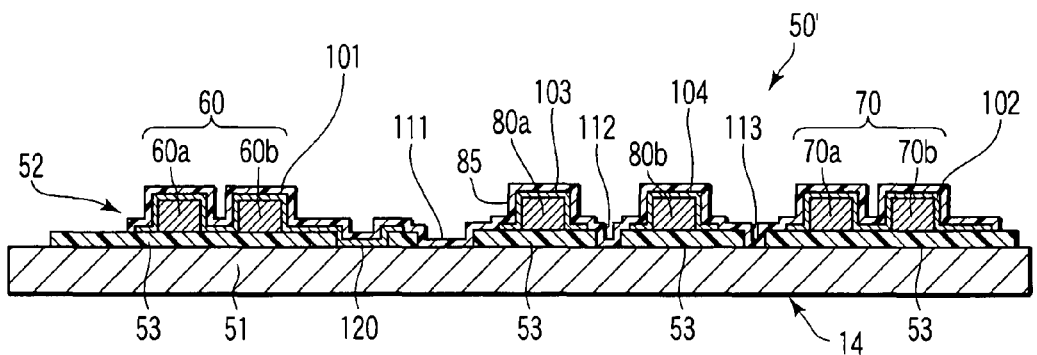
F I G. 7

SUSPENSION DEVICE

CROSS-REFERENCE TO RELATED APPLICATIONS

This application is based upon and claims the benefit of priority from prior Japanese Patent Application No. 2006-248437, filed Sep. 13, 2006, the entire contents of which are incorporated herein by reference.

BACKGROUND OF THE INVENTION

1. Field of the Invention

This invention relates to a suspension device for a hard disc drive apparatus (HDD) used in an information processing apparatus, such as a personal computer.

2. Description of the Related Art

A hard disc drive apparatus (HDD, hereinafter referred to simply as a disc drive apparatus) is used in an information processing apparatus, such as a personal computer. The disc drive includes a magnetic disc that rotates around a spindle, a carriage turnable around a pivot axis, etc. A suspension device is provided on an arm of the carriage.

The suspension device includes a load beam fixed to the carriage, a flexure fixed overlapping the load beam, etc. A slider is attached to a tongue portion that is formed on the flexure. The slider is provided with an element (transducer) for reading or writing data.

Flexures of various forms are being manufactured according to required specifications. A flexure with conductors has been developed as an example flexure. The flexure with conductors includes a metal plate formed of a thin stainless steel plate, a insulating layer formed thereon, a read conductor, a write conductor, etc. The read and write conductors are individually formed on the insulating layer. If necessary, the flexure may be provided with heater conductors.

Respective one ends of the read and write conductors are connected to the read and write elements. For example, MR elements are used as the read and write elements. The respective other ends of the read and write conductors are connected to an amplifier. A pair of heater conductors are connected to a heater that is contained in the slider.

In manufacturing the suspension device, conductor portions and the like of the flexure may possibly be charged with static electricity if they come into contact with their surrounding members with the read and write conductors disconnected from the amplifier. If this static electricity flows through the read and write conductors into the read and write elements, the elements may possibly be destroyed by electrostatic discharge (ESD).

An example of anti-ESD means is disclosed in Jpn. Pat. Appln. KOKAI Publication No. 2002-123917. In this prior art, a large number of diodes are connected to the read and write conductors, and voltage produced by frictional charge is spread by the diodes. In a conventional suspension device with this anti-ESD means, the many very small diodes must be connected to the read and write conductors to obtain a predetermined polarity. Thus, bonding the diodes requires much labor and a larger number of components, thereby entailing an increase in cost.

In another example of anti-ESD means, a high-resistance semiconductive layer is used in place of the diodes to cover conductor portions of a flexure. This semiconductive layer is grounded to a metal plate. Thus, static electricity with which the flexure is charged can be released to the metal plate through the semiconductive layer.

However, in a flexure with conductors that is provided with heater conductors, for example, a relatively large potential difference continues to be applied between conductors during use of the suspension device. Thus, migration may occur along the semiconductive layer between the conductors that are subject to the potential difference, so that a short-circuit-causing substance, such as a dendrite, may possibly be formed.

BRIEF SUMMARY OF THE INVENTION

The object of this invention is to provide a suspension device based on a countermeasure against electrostatic discharge (ESD) and capable of preventing migration.

According to this invention, there is provided a suspension device comprising a flexure with conductors to which a slider including a read element and a write element is attached and a load beam which supports the flexure. The flexure with conductors includes a metal plate, a insulating layer formed on the metal plate, a first electrically conductive member formed on the insulating layer and electrically connected to the read element, a second electrically conductive member formed in a position separate from the first electrically conductive member on the insulating layer and electrically connected to the write element, a first semiconductive layer formed covering at least a part of an outer surface of the first electrically conductive member and grounded to the metal plate, a second semiconductive layer formed covering at least a part of an outer surface of the second electrically conductive member and grounded to the metal plate, and an insulating portion which electrically isolates the first and second semiconductive layers.

According to this arrangement, static electricity generated in the flexure with conductors can be released to the metal plate through the semiconductive layers. Therefore, the read and write elements can be prevented from being destroyed by ESD. Even if a potential difference is caused between the electrically conductive members, occurrence of migration along the semiconductive layers can be prevented, so that causes of short-circuiting of the electrically conductive members can be eliminated.

Respective resistance values of the first and second semiconductive layers individually range from $10^6$ to $10^{11}$ Ω.

In an aspect of the invention, a first ground terminal which conducts with the metal plate is formed near the first electrically conductive member, a second ground terminal which conducts with the metal plate is formed near the second electrically conductive member, the first semiconductive layer is formed over both the first electrically conductive member and the first ground terminal, and the second semiconductive layer is formed over both the second electrically conductive member and the second ground terminal. Static electricity with which the flexure is charged is released to the metal plate through the ground terminals.

In another aspect of the invention, an extending portion which is joined to the metal plate is formed on a part of the first semiconductive layer, and another extending portion which is joined to the metal plate is formed on a part of the second semiconductive layer. Static electricity with which the flexure is charged is released to the metal plate through the extending portion.

In still another aspect of the invention, the first electrically conductive member is formed of a pair of read conductors such that the first semiconductive layer is formed over both the read conductors, and the second electrically conductive member is formed of a pair of write conductors such that the second semiconductive layer is formed over both the write conductors.

In a further aspect of the invention, the slider includes a heater, the flexure with conductors is formed having a pair of heater conductors electrically connected to the heater, and the device further comprises a third semiconductive layer formed covering at least a part of an outer surface of one of the paired heater conductors and grounded to the metal plate, a fourth semiconductive layer formed covering at least a part of an outer surface of the other of the paired heater conductors and grounded to the metal plate, and an insulating portion which electrically isolates the third and fourth semiconductive layers.

Preferably, a third ground terminal which conducts with the metal plate is formed near the one heater conductor, a fourth ground terminal which conducts with the metal plate is formed near the other heater conductor, the third semiconductive layer is formed over both the one heater conductor and the third ground terminal, and the fourth semiconductive layer is formed over both the other heater conductor and the fourth ground terminal.

Alternatively, an extending portion which is joined to the metal plate may be formed on a part of the third semiconductive layer, and another extending portion which is joined to the metal plate is formed on a part of the fourth semiconductive layer.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is a sectional view of the anti-ESD section taken along line F5-F5 of FIG. 4;

FIG. 6 is a sectional view of the anti-ESD section taken along line F6-F6 of FIG. 4; and FIG. 7 is a sectional view of an anti-ESD section of a suspension device according to a second embodiment of the invention.

DETAILED DESCRIPTION OF THE INVENTION

A suspension device according to a first embodiment of this invention will now be described with reference to FIGS. 1 to 6.

Figure 1:
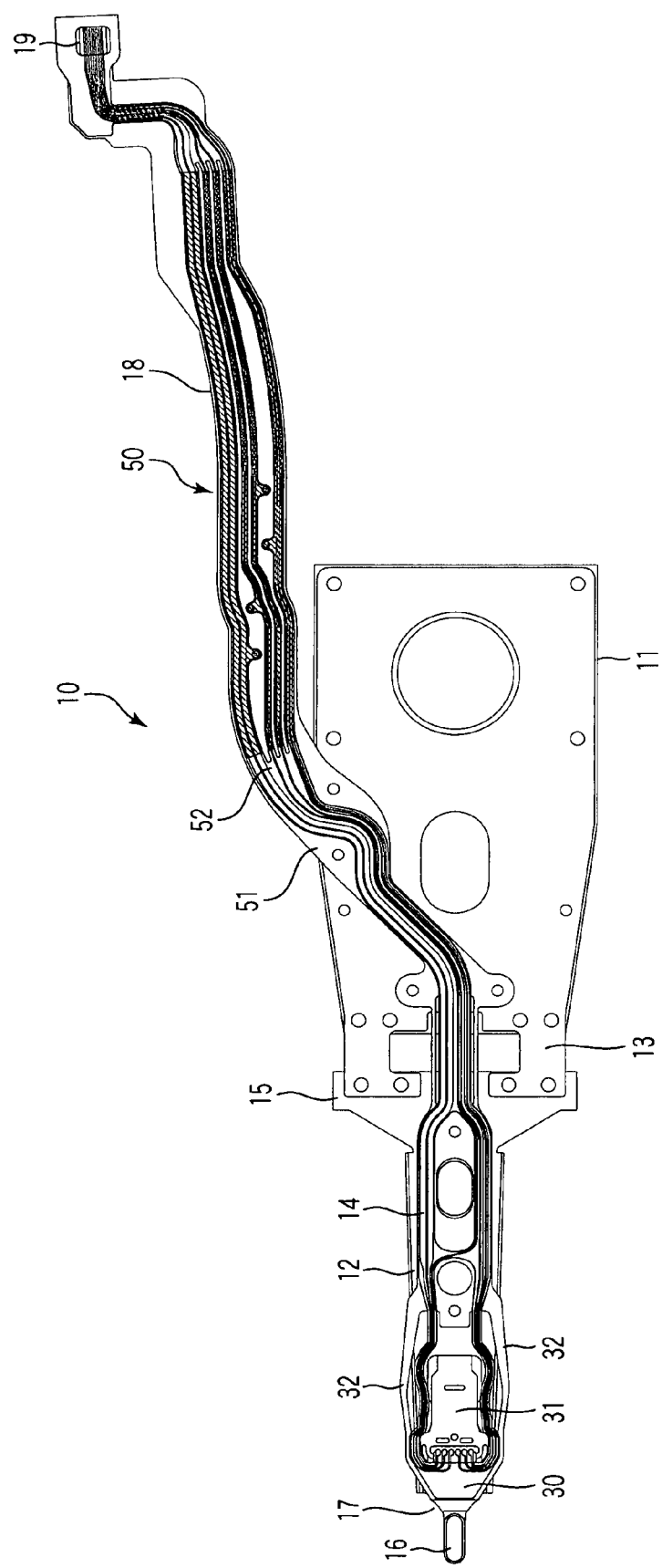
FIG. 1 is a plan view of a suspension device according to a first embodiment of the invention.

A suspension device 10 shown in FIG. 1 is provided with a base plate 11, a load beam 12, a hinge member 13, and a flexure 14 with conductors. The load beam 12 has a proximal portion 15 fixed to the hinge member 13 and a distal end portion 17. If necessary, a loading/unloading tab 16 is formed on the distal end portion 17. The base plate 11 is fixed to an arm of a carriage (not shown).

The flexure 14 extends along the load beam 12 axially (or longitudinally). A part of the flexure 14 is lapped on the load beam 12. The flexure 14 is fixed to the load beam 12 by fixing means such as laser welding. A rear part (flexure tail portion) 18 of the flexure 14 extends behind the base plate 11. A terminal area 19 is provided on an end portion of the flexure 14. The terminal area 19 is connected to an amplifier (not shown).

Figure 2:
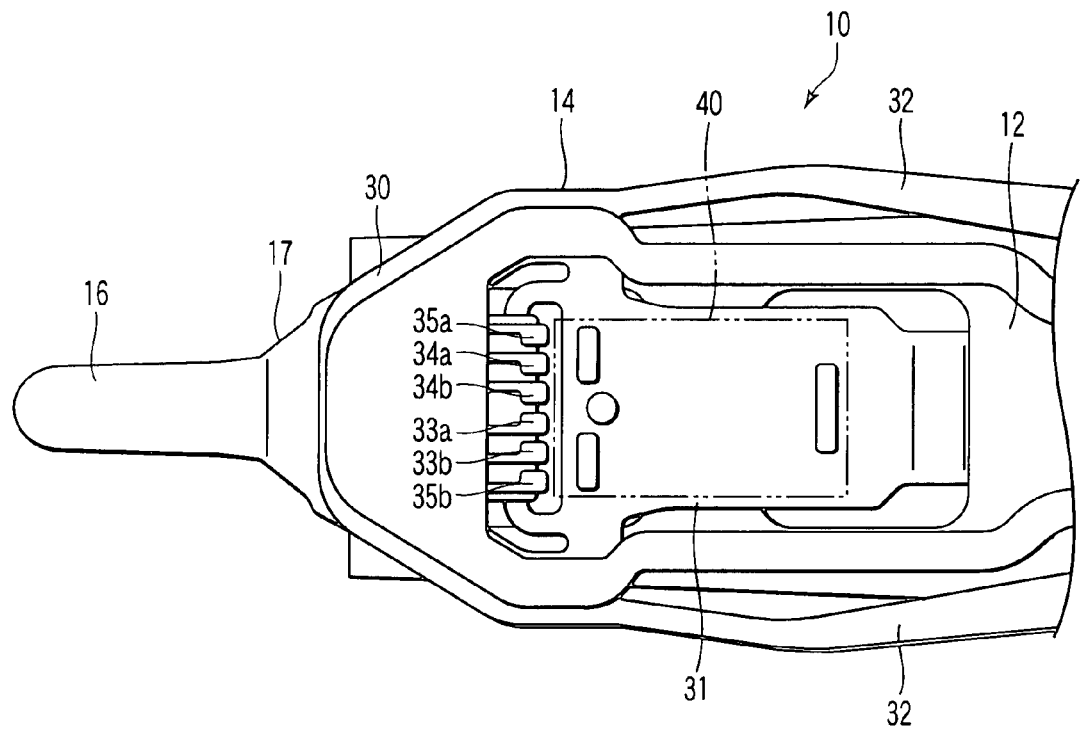
FIG. 2 is an enlarged plan view showing a distal end portion of the suspension device shown in FIG. 1.

As shown in FIG. 2, a tongue portion 31, a pair of outrigger portions 32, and pads 33a, 33b, 34a, 34b, 35a and 35b are provided near a distal end portion 30 of the flexure 14. These pads function as connection terminals. The outrigger portions 32 are situated individually on the opposite sides of the tongue portion 31. The tongue portion 31 is fitted with a slider 40 (indicated by two-dot chain line in FIG. 2) that serves as a magnetic head.

Figure 3:
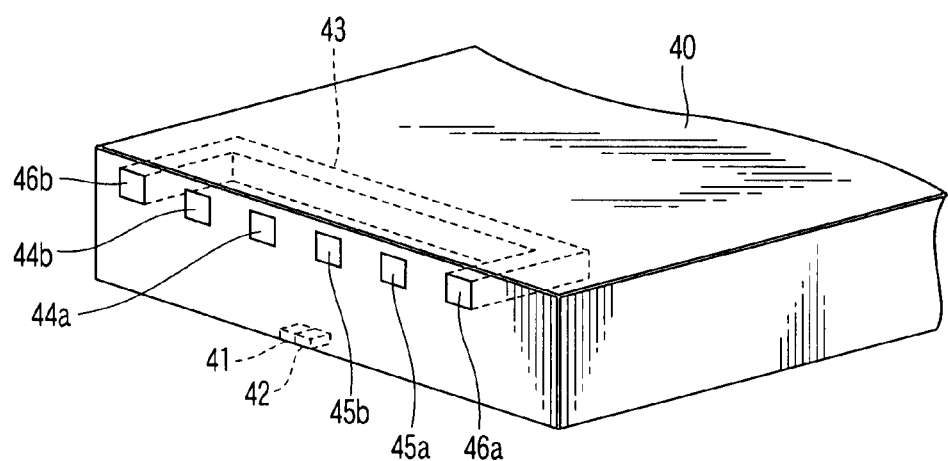
FIG. 3 is a perspective view showing a part of a slider attached to the suspension device shown in FIG. 1.

As typically shown in FIG. 3, the slider 40 is provided with a read element 41 and a write element 42. The read and write elements 41 and 42 are each formed of a magnetoelectric device, such as a magnetoresistive (MR) element. These elements 41 and 42 are used to access a magnetic disc (not shown) as a recording medium. Further, the slider 40 has therein a heater 43 that functions as a heating element. Pads 44a, 44b, 45a, 45b, 46a and 46b, which function as connection terminals, are arranged on an end face of the slider 40.

Figure 4:
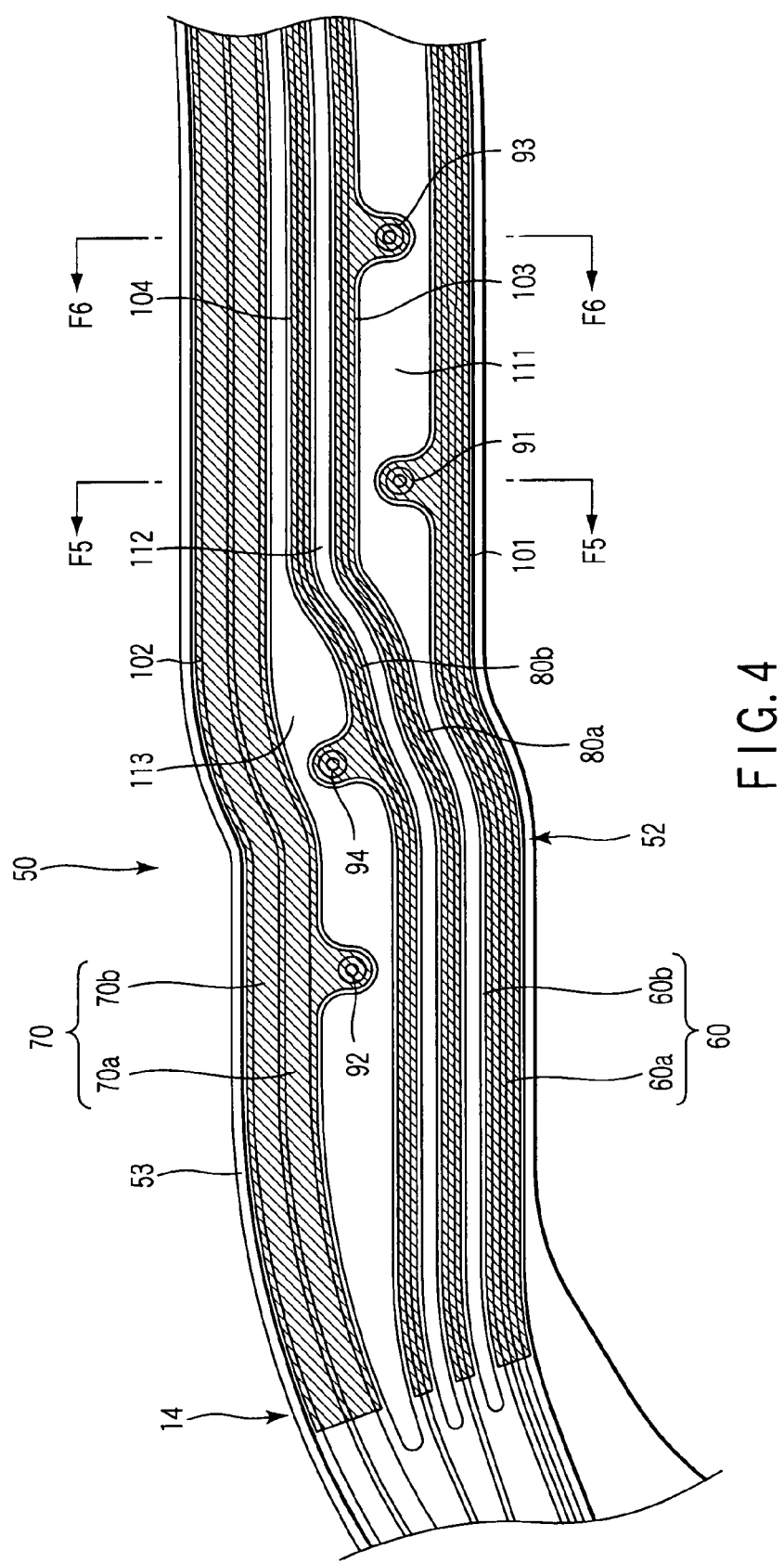
FIG. 4 is a plan view showing an anti-ESD section of the suspension device shown in FIG. 1.

As shown in FIGS. 4 to 6, an anti-ESD section 50 is provided at a longitudinal part of the flexure 14 with conductors. The following is a description of the anti-ESD section 50.

As typically shown in FIG. 5, the flexure 14 with conductors includes a metal plate 51 and a conductive portion 52. The plate 51 is formed of a thin, springy stainless steel plate. The conductive portion 52 is formed on the plate 51.

The conductive portion 52 is provided with a electrically insulating layer 53, first electrically conductive member 60, second electrically conductive member 70, heater conductors 80a and 80b, semiconductive layers 101, 102, 103 and 104, cover layer 85, etc. The first electrically conductive member 60 is composed of a pair of read conductors 60a and 60b. The second electrically conductive member 70 is composed of a pair of write conductors 70a and 70b. The cover layer 85 covers the conductors 60a, 60b, 70a, 70b, 80a and 80b and the semiconductive layers 101, 102, 103 and 104. In FIG. 4, the anti-ESD section 50 is typically illustrated with the cover layer 85 omitted. The semiconductive layers 101, 102, 103 and 104 are indicated by hatching in FIG. 4.

The read conductors 60a and 60b, write conductors 70a and 70b, and heater conductors 80a and 80b are formed in separate positions. The heater conductors 80a and 80b are formed between the read conductors 60a and 60b and the write conductors 70a and 70b.

The read conductors 60a and 60b are connected to the pads 33a and 33b shown in FIG. 2. These pads 33a and 33b are bonded to the pads 44a and 44b (shown in FIG. 3), respectively, of the slider 40. Thus, the read conductors 60a and 60b are electrically connected to the read element 41.

The write conductors 70a and 70b are connected to the pads 34a and 34b shown in FIG. 2. These pads 34a and 34b are bonded to the pads 45a and 45b (shown in FIG. 3), respectively, of the slider 40. Thus, the write conductors 70a and 70b are electrically connected to the write element 42.

The heater conductors 80a and 80b are connected to the pads 35a and 35b shown in FIG. 2. These pads 35a and 35b are bonded to the pads 46a and 46b (shown in FIG. 3), respectively, of the slider 40. Thus, the heater conductors 80a and 80b are electrically connected to the heater 43.

The read conductors 60a and 60b, write conductors 70a and 70b, and heater conductors 80a and 80b are made of a metal with low electrical resistance, such as copper. The conductors 60a, 60b, 70a, 70b, 80a and 80b are formed on the insulating layer 53 by copper plating or by etching a copper plate, for example. The insulating layer 53 and the cover layer 85 are made of an electrically insulating polymeric material, such as polyimide.

As shown in FIG. 4, a first ground terminal 91 is formed near the first electrically conductive member 60. As shown in FIG. 5, the ground terminal 91 is provided on the metal plate 51. The first ground terminal 91 electrically conducts with the metal plate 51. A second ground terminal 92 (shown in FIG. 4) is formed near the second electrically conductive member 70. The second ground terminal 92 also electrically conducts with the metal plate 51.

As shown in FIG. 6, a third ground terminal 93 is provided near the one heater conductor 80a. A fourth ground terminal 94 (shown in FIG. 4) is provided near the other heater conductor 80b. These ground terminals 93 and 94 also electrically conduct with the metal plate 51.

The first semiconductive layer 101 covers parts of the respective outer peripheral surfaces of the pair of read conductors 60a and 60b. The first semiconductive layer 101 is formed ranging between the read conductors 60a and 60b and the first ground terminal 91. Thus, the first semiconductive layer 101 is grounded to the metal plate 51 through the first ground terminal 91.

The second semiconductive layer 102 covers parts of the respective outer peripheral surfaces of the pair of read conductors 70a and 70b. The second semiconductive layer 102 is formed ranging between the write conductors 70a and 70b and the second ground terminal 92. Thus, the second semiconductive layer 102 is grounded to the metal plate 51 through the second ground terminal 92.

The third semiconductive layer 103 covers a part of the outer peripheral surface of the one heater conductor 80a. The third semiconductive layer 103 is formed ranging between the heater conductor 80a and the third ground terminal 93. Thus, the third semiconductive layer 103 is grounded to the metal plate 51 through the third ground terminal 93.

The fourth semiconductive layer 104 covers a part of the outer peripheral surface of the other heater conductor 80b. The fourth semiconductive layer 104 is formed ranging between the heater conductor 80b and the fourth ground terminal 94. Thus, the fourth semiconductive layer 104 is grounded to the metal plate 51 through the fourth ground terminal 94.

The respective resistance values of the semiconductive layers 101, 102, 103 and 104 individually range from $10^6$ to $10^{11}$ Ω. These values are incommensurably larger than the respective resistance value of the conductors 60a, 60b, 70a, 70b, 80a and 80b (resistance value of copper). However, the semiconductive layers 101, 102, 103 and 104 can conduct static electricity.

The semiconductive layers 101, 102, 103 and 104 are electrically isolated from one another by insulating portions 111, 112 and 113. The first insulating portion 111 is formed between the first and third semiconductive layers 101 and 103. The second insulating portion 112 is formed between the third and fourth semiconductive layers 103 and 104. The third insulating portion 113 is formed between the fourth and second semiconductive layers 104 and 102. As shown in FIGS. 5 and 6, each of the insulating portions 111, 112 and 113 is loaded with a part of the cover layer 85 in place of the insulating layer 53.

During manufacture or inspection of the suspension device 10, static electricity may possibly be generated in the conductive portion 52 of the flexure 14. According to the flexure 14 provided with the anti-ESD section 50 of the aforementioned construction, however, this static electricity can be released to the metal plate 51 through at least parts of the semiconductive layers 101, 102, 103 and 104 and the ground terminals 91, 92, 93 and 94. Thus, the read and write elements 41 and 42, which, like MR elements, are supposed to be susceptible to high voltage, can be prevented from being destroyed by static electricity.

When the suspension device 10 is in operation, a relatively large potential difference (e.g., 6 V or thereabouts) may continue to be generated between the heater conductors 80a and 80b, in some cases. Possibly, a potential difference may also be generated between the first electrically conductive member 60 and the one heater conductor 80a or between the second electrically conductive member 70 and the other heater conductor 80b. Even if such a potential difference is caused, the insulating portions 111, 112 and 113 can prevent occurrence of migration. Thus, the possibility of production of short-circuit-causing substances can be eliminated.

In the flexure 14, moreover, the read conductors 60a and 60b can be located close enough to one another, and the write conductors 70a and 70b can also be located close enough to one another. Thus, favorable results can be obtained with respect to the electrical properties (impedance matching, etc.).

FIG. 7 shows a flexure 14 with conductors that is provided with an anti-ESD section 50' according to a second embodiment of the invention. In this anti-ESD section 50', an extending portion 120 is formed on a part of the semiconductive layer 101. The extending portion 120 is joined to a metal plate 51. Each of the second, third, and fourth semiconductive layers 102, 103 and 104 is also formed having an extending portion (not shown), which is bonded to the metal plate 51.

In the case of the anti-ESD section 50' of this embodiment, static electricity that is generated in a conductive portion 52 of the flexure 14 or the like can be released to the metal plate 51 through semiconductive layers 101, 102, 103 and 104 and the extending portion 120. Since the anti-ESD section 50' of the second embodiment shares other configurations and functions with the anti-ESD section 50 of the first embodiment, like numerals are used to designate common portions of the two embodiments, and a description of those portions is omitted. The parts of the ground terminals 91 to 94 described in connection with the first embodiment and the extending portion 120 of the second embodiment may be used in combination.

It is to be understood, in carrying out this invention, that the components of this invention, including the respective configurations of the load beam, flexure, metal plate, insulating layer, semiconductive layers, and insulating portions, etc., may be variously modified without departing from the spirit or scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A suspension device comprising a flexure with conductors to which a slider including a read element and a write element is attached and a load beam which supports the flexure, the flexure comprising:
    a metal plate,
    an insulating layer formed on the metal plate,
    a first electrically conductive member formed on the insulating layer and electrically connected to the read element,
    a second electrically conductive member formed in a position separate from the first electrically conductive member on the insulating layer and electrically connected to the write element,
    a first semiconductive layer formed covering at least a part of an outer surface of the first electrically conductive member and grounded to the metal plate,
    a second semiconductive layer formed covering at least a part of an outer surface of the second electrically conductive member and grounded to the metal plate, and
    an insulating portion which electrically isolates the first and second semiconductive layers,
    wherein a first ground terminal which conducts with the metal plate is formed near the first electrically conductive member, a second ground terminal which conducts with the metal plate is formed near the second electrically conductive member, the first semiconductive layer is formed over both the first electrically conductive member and the first ground terminal, and the second semiconductive layer is formed over both the second electrically conductive member and the second ground terminal.

2. A suspension device according to claim 1, wherein respective resistance values of the first and second semiconductive layers individually range from $10^6$ to $10^{11}$ Ω.

3. A suspension device according to claim 2, wherein the first electrically conductive member comprises a pair of read conductors such that the first semiconductive layer is formed over both the read conductors, and the second electrically conductive member comprises a pair of write conductors such that the second semiconductive layer is formed over both the write conductors.

4. A suspension device according to claim 3, wherein the slider includes a heater and the flexure further comprises:
    a pair of heater conductors electrically connected to the heater,
    a third semiconductive layer formed covering at least a part of an outer surface of one of the paired heater conductors and grounded to the metal plate,
    a fourth semiconductive layer formed covering at least a part of an outer surface of the other of the paired heater conductors and grounded to the metal plate, and
    an insulating portion which electrically isolates the third and fourth semiconductive layers.

5. A suspension device according to claim 4, wherein a third ground terminal which conducts with the metal plate is formed near the one heater conductor, a fourth ground terminal which conducts with the metal plate is formed near the other heater conductor, the third semiconductive layer is formed over both the one heater conductor and the third ground terminal, and the fourth semiconductive layer is formed over both the other heater conductor and the fourth ground terminal.

6. A suspension device according to claim 4, wherein an extending portion which is joined to the metal plate is formed on a part of the third semiconductive layer, and another extending portion which is joined to the metal plate is formed on a part of the fourth semiconductive layer.

7. A suspension device according to claim 1, wherein an extending portion which is joined to the metal plate is formed on a part of the first semiconductive layer, and another extending portion which is joined to the metal plate is formed on a part of the second semiconductive layer.

8. A suspension device according to claim 7, wherein the first electrically conductive member comprises a pair of read conductors such that the first semiconductive layer is formed over both the read conductors, and the second electrically conductive member comprises a pair of write conductors such that the second semiconductive layer is formed over both the write conductors.

9. A suspension device according to claim 8, wherein the slider includes a heater and the flexure further comprises:
    a pair of heater conductors electrically connected to the heater,
    a third semiconductive layer formed covering at least a part of an outer surface of one of the paired heater conductors and grounded to the metal plate,
    a fourth semiconductive layer formed covering at least a part of an outer surface of the other of the paired heater conductors and grounded to the metal plate, and
    an insulating portion which electrically isolates the third and fourth semiconductive layers.

10. A suspension device according to claim 9, wherein a third ground terminal which conducts with the metal plate is formed near the one heater conductor, a fourth ground terminal which conducts with the metal plate is formed near the other heater conductor, the third semiconductive layer is formed over both the one heater conductor and the third ground terminal, and the fourth semiconductive layer is formed over both the other heater conductor and the fourth ground terminal.

11. A suspension device according to claim 9, wherein an extending portion which is joined to the metal plate is formed on a part of the third semiconductive layer, and another extending portion which is joined to the metal plate is formed on a part of the fourth semiconductive layer.

12. A suspension device according to claim 1, wherein the first electrically conductive member comprises a pair of read conductors such that the first semiconductive layer is formed over both the read conductors, and the second electrically conductive member comprises a pair of write conductors such that the second semiconductive layer is formed over both the write conductors.

13. A suspension device according to claim 12, wherein the slider includes a heater and the flexure further comprises:
    a pair of heater conductors electrically connected to the heater,
    a third semiconductive layer formed covering at least a part of an outer surface of one of the paired heater conductors and grounded to the metal plate,
    a fourth semiconductive layer formed covering at least a part of an outer surface of the other of the paired heater conductors and grounded to the metal plate, and
    an insulating portion which electrically isolates the third and fourth semiconductive layers.

14. A suspension device according to claim 13, wherein a third ground terminal which conducts with the metal plate is formed near the one heater conductor, a fourth ground terminal which conducts with the metal plate is formed near the other heater conductor, the third semiconductive layer is formed over both the one heater conductor and the third ground terminal, and the fourth semiconductive layer is formed over both the other heater conductor and the fourth ground terminal.

15. A suspension device according to claim 13, wherein an extending portion which is joined to the metal plate is formed on a part of the third semiconductive layer, and another extending portion which is joined to the metal plate is formed on a part of the fourth semiconductive layer.

* * * * *